United States Patent
Yamazaki

(10) Patent No.: US 9,586,454 B2
(45) Date of Patent: Mar. 7, 2017

(54) SUSPENSION SYSTEM FOR VEHICLE

(71) Applicant: TOYOTA JIDOSHA KABUSHIKI KAISHA, Toyota-shi (JP)

(72) Inventor: Ippei Yamazaki, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/894,796

(22) PCT Filed: May 30, 2013

(86) PCT No.: PCT/JP2013/065088
§ 371 (c)(1),
(2) Date: Nov. 30, 2015

(87) PCT Pub. No.: WO2014/192122
PCT Pub. Date: Dec. 4, 2014

(65) Prior Publication Data
US 2016/0107498 A1    Apr. 21, 2016

(51) Int. Cl.
*B60G 17/015* (2006.01)
*B60G 17/016* (2006.01)
(Continued)

(52) U.S. Cl.
CPC ......... *B60G 17/016* (2013.01); *B60G 17/018* (2013.01); *B60G 17/0162* (2013.01);
(Continued)

(58) Field of Classification Search
CPC ............... B60G 17/016; B60G 17/018; B60G 17/0164; B60G 17/0162; B60G 2400/252;
(Continued)

(56) References Cited

U.S. PATENT DOCUMENTS 5,088,760 A    2/1992    Kakizaki et al.
5,828,970 A    10/1998    Kimura et al.
(Continued)

FOREIGN PATENT DOCUMENTS

JP    3 42320     2/1991
JP    5 124413    5/1993
(Continued)

OTHER PUBLICATIONS

International Search Report issued Jul. 16, 2013 in PCT/JP2013/065088 filed May 30, 2013.

*Primary Examiner* — Michael J Zanelli
(74) *Attorney, Agent, or Firm* — Oblon, McClelland, Maier & Neustadt, L.L.P.

(57) ABSTRACT

A suspension system for a vehicle, includes (a) a shock absorber disposed between a sprung portion and an unsprung portion and having a damping-force changing mechanism, the shock absorber being configured to generate a damping force with respect to a relative movement of the sprung portion and the unsprung portion such that the magnitude of the damping force is changeable, and (b) a controller configured to control the damping-force changing mechanism. The controller includes a target sprung-speed determining portion configured to determine, as a target sprung speed, a speed of the sprung portion in a behavior of a body of the vehicle that matches an operation input to the vehicle by a driver, for permitting the behavior to match the operation input, the controller being configured to control the damping force such that the speed of the sprung portion becomes equal to the target sprung speed.

9 Claims, 8 Drawing Sheets

(51) Int. Cl.
*B60G 17/018* (2006.01)
*B60G 17/08* (2006.01)

(52) U.S. Cl.
CPC ......... *B60G 17/0164* (2013.01); *B60G 17/08* (2013.01); *B60G 2206/41* (2013.01); *B60G 2400/102* (2013.01); *B60G 2400/104* (2013.01); *B60G 2400/106* (2013.01); *B60G 2400/204* (2013.01); *B60G 2400/2042* (2013.01); *B60G 2400/252* (2013.01); *B60G 2400/34* (2013.01); *B60G 2400/39* (2013.01); *B60G 2400/41* (2013.01); *B60G 2500/104* (2013.01); *B60G 2600/184* (2013.01); *B60G 2600/26* (2013.01); *B60G 2600/82* (2013.01); *B60G 2800/012* (2013.01); *B60G 2800/014* (2013.01); *B60G 2800/91* (2013.01)

(58) Field of Classification Search
CPC ............ B60G 2400/39; B60G 2400/41; B60G 2400/204
See application file for complete search history.

(56) References Cited

U.S. PATENT DOCUMENTS

| | | | | |
|---|---|---|---|---|
| 6,058,340 | A | * | 5/2000 | Uchiyama .......... B60G 17/0165 280/5.514 |
| 2013/0079988 | A1 | | 3/2013 | Hirao et al. |
| 2013/0158799 | A1 | | 6/2013 | Kamimura |
| 2013/0253764 | A1 | * | 9/2013 | Kikuchi ............. B60G 17/0195 701/38 |
| 2014/0095024 | A1 | * | 4/2014 | Hirao ................... B60G 17/018 701/37 |

FOREIGN PATENT DOCUMENTS

| | | | |
|---|---|---|---|
| JP | 2000 343922 | | 12/2000 |
| JP | 3272828 B2 | | 4/2002 |
| JP | 2009-179293 | * | 8/2009 |
| JP | 2013 71558 | | 4/2013 |
| WO | 2012 032655 | | 3/2012 |

* cited by examiner

SUSPENSION SYSTEM FOR VEHICLE

TECHNICAL FIELD

The present invention relates to a suspension system for a vehicle having shock absorbers each configured to generate a damping force with respect to a relative movement of a sprung portion and an unsprung portion such that the magnitude of the damping force is changeable.

BACKGROUND ART

The following Patent Literatures describe a suspension system for a vehicle having shock absorbers each of which includes a damping-force changing mechanism for changing a magnitude of a damping force with respect to a relative movement of a sprung portion and an unsprung portion and each of which is configured to generate the damping force with respect to the relative movement of the sprung portion and the unsprung portion such that the magnitude of the damping force is changeable. As described in the following Patent Literatures, there are various techniques of controlling the damping force by controlling the damping-force changing mechanism.

Patent Literature 1: JP-A-3-42320
Patent Literature 2: WO/2012/032655
Patent Literature 3: JP-A-5-124413

SUMMARY OF INVENTION

Technical Problem

In suspension systems described above, the damping-force changing mechanism is controlled for the purpose of achieving good ride comfort and steering stability at the same time. In addition to ride comfort and steering stability, there are some other aspects to note. It is thus possible to enhance utility of the suspension system by making various modifications focusing on the aspects. The invention has been attained in view of such situations, and the invention provides a suspension system for a vehicle having high utility.

Solution to Problem

To solve the problem indicated above, the invention provides a suspension system for a vehicle in which a target sprung speed as a target of a speed of a sprung portion is determined based on an operation input to the vehicle by a driver and a damping force is controlled such that the speed of the sprung portion becomes equal to the target sprung speed.

Advantageous Effects of Invention

According to the suspension system for the vehicle of the invention, a behavior of a body of the vehicle is controlled such that the sprung speed becomes equal to the target sprung speed determined based on the operation input to the vehicle by the driver, so that the behavior of the body of the vehicle matches or be consonant with the operation by the driver. That is, the present suspension system is advantageous in that the system can give the driver an appropriate operation feeling. Thus, the present suspension system has high utility.

Forms of Invention

There will be exemplified and explained various forms of an invention that is considered claimable. (The invention will be hereinafter referred to as "claimable invention" where appropriate). Each of the forms is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following description of various forms and an embodiment. It is to be further understood that, as long as the claimable invention is construed in this way, any form in which one or more constituent elements is/are added to or deleted from any one of the following forms may be considered as one form of the claimable invention.

(1) A suspension system for a vehicle, comprising: (a) a shock absorber disposed between a sprung portion and an unsprung portion and having a damping-force changing mechanism for changing a magnitude of a damping force, the shock absorber being configured to generate the damping force with respect to a relative movement of the sprung portion and the unsprung portion such that the magnitude of the damping force is changeable; and (b) a controller configured to control the damping-force changing mechanism so as to control the damping force to be generated by the shock absorber, wherein the controller includes a target sprung-speed determining portion configured to determine, based on an operation input to the vehicle by a driver, a target sprung speed as a target of a speed of the sprung portion, the controller being configured to control the damping force such that the speed of the sprung portion becomes equal to the target sprung speed.

In the suspension system for the vehicle according to this form, a behavior of a body of the vehicle is controlled so as to attain the target sprung speed determined based on the operation input to the vehicle by the driver. Consequently, the vehicle body behaves according to the operation by the driver, so that it is possible to reduce an unnatural feeling which would be otherwise given to the driver due to inconsistency between the operation by the driver and the behavior of the vehicle body, namely, it is possible to give an appropriate operation feeling to the driver.

The suspension system of this form may be configured to determine the target sprung speed based on a steering operation, an accelerating operation, or a braking operation, for instance, whereby a rolling motion of the vehicle body can match or be consonant with the steering operation and a pitching motion of the vehicle body can match or be consonant with the accelerating operation or the braking operation.

The damping force $F_D$ to be generated by the shock absorber depends on a relative speed of the sprung portion and the unsprung portion $v_{S/US}$ (hereinafter referred to as "sprung-unsprung relative speed" where appropriate), and is simply represented by the following expression:

$$F_D = \zeta \cdot v_{S/US} \quad \zeta: \text{damping coefficient}$$

Consequently, in an instance were the damping force generated by the shock absorber is compared, it is needed to compare under the same sprung-unsprung relative speed $v_{S/US}$. In view of this, the level of the damping force may mean a difference in damping-force generating characteristics, specifically, may mean the level of the damping coefficient. Further, changing of the damping force by the "damping-force changing mechanism" may mean changing of the damping-force generating characteristics, specifically, changing of the damping coefficient.

(2) The suspension system for the vehicle according to the form (1), wherein the target sprung-speed determining portion is configured to determine the target sprung speed based on a steering operation input by the driver.

In this form, the target sprung speed is determined utilizing, as the operation input by the driver, at least the steering operation. According to this form, the rolling motion of the vehicle body can match or be consonant with the steering operation.

(3) The suspension system for the vehicle according to the form (2), wherein the target sprung-speed determining portion is configured to determine, based on an operation speed of the steering operation and a speed of the vehicle, a target roll speed as a target of a speed at which a body of the vehicle is caused to be rolled and to determine the target sprung speed based on the target roll speed.

(4) The suspension system for the vehicle according to the form (3), wherein the target sprung-speed determining portion is configured to determine the target roll speed by a product of a gain determined based on the speed of the vehicle and the operation speed of the steering operation.

In each of the above two forms, the method for determining the target sprung speed based on the steering operation is specified. The target sprung speed of each of the shock absorbers corresponding to the respective wheels is determined based on the target roll speed.

(5) The suspension system for the vehicle according to any one of the forms (1)-(4), wherein the target sprung-speed determining portion is configured to determine the target sprung speed based on the operation input to the vehicle by the driver and information relating to motion control being executed in the vehicle.

In recent years, some vehicles are configured such that a motion of vehicles is caused by control, independently of the operation input by the driver. For instance, the control includes control for adjusting an orientation of the vehicle to reduce sideslip of the vehicle and control for adjusting the speed of the vehicle so as to run following a preceding vehicle running ahead thereof. In this form, the target sprung speed is determined utilizing information relating to such control, in addition to the operation input by the driver. This form enables the vehicle body to behave with consideration given to actual turning of the vehicle and the degree of actual acceleration or deceleration of the vehicle. It is thus possible to reduce an unnatural feeling which would be otherwise given to the driver due to inconsistency between the running state of the vehicle and the behavior of the vehicle body.

(6) The suspension system for the vehicle according to the form (5),
wherein the vehicle on which the suspension system is installed is configured to execute, as the motion control being executed in the vehicle, vehicle-body turning control in which an orientation of a body of the vehicle is changed, independently of changing of the orientation of the body of the vehicle by a steering operation input by the driver, and
wherein the target sprung-speed determining portion is configured to determine the target sprung speed based on the steering operation input by the driver and the information relating to the vehicle-body turning control.

In this form, the motion control of the vehicle is limited. The "vehicle-body turning control" is for adjusting the orientation of the vehicle body by adjusting acceleration or deceleration for each wheel to reduce sideslip of the vehicle, for instance. In an instance where such vehicle-body turning control is executed, an amount of changing the orientation of the vehicle body by the vehicle-body turning control is added to an amount of changing the orientation of the vehicle body by the steering operation. In this form, therefore, the target sprung speed may be determined based on an amount of changing the orientation of the vehicle body obtained by adding the amount of changing the orientation of the vehicle body by the steering operation and the amount of changing the orientation of the vehicle body by the vehicle-body turning control. Further, the amount of changing the orientation of the vehicle body by the vehicle-body turning control may be converted into the operation amount of the steering operation, and the target sprung speed may be determined based on a value obtained by correcting an actual steering operation amount using the converted value. In this respect, the amount of changing the orientation of the vehicle body by the vehicle-body turning control may be obtained based on a slip angle, a yaw rate, etc., in turning of the vehicle, for instance.

(7) The suspension system for the vehicle according to any one of the forms (1)-(6),
wherein the controller further includes:
a basic damping-force determining portion configured to determine a basic damping force which has a magnitude in accordance with a predetermined control rule and which is a basis when determining a target of the damping force to be generated by the shock absorber; and
a target damping-force determining portion configured to determine a target damping force as the target of the damping force to be generated by the shock absorber by correcting the basic damping force based on the target sprung speed.

In this form, the damping force to be generated in control of the basic damping force is increased or decreased for correction, based on the target sprung speed, while the control of the basic damping force is being executed. The damping force generated by the shock absorber acts on the relative movement of the sprung portion and the unsprung portion. Consequently, the basic damping force may be corrected so as to be increased or decreased based on the direction of the relative movement of the sprung portion and the unsprung portion and the direction of the target sprung speed, for instance. Further, the target sprung speed may be determined with consideration given to the actual sprung speed in addition to the target sprung speed, as later explained in detail.

(8) The suspension system for the vehicle according to the form (7),
wherein the controller further includes an actual sprung-speed obtaining portion configured to obtain an actual sprung speed that is an actual speed of the sprung portion, and
wherein the target damping-force determining portion is configured to correct the basic damping force based on a sprung speed deviation that is a deviation of the actual sprung speed from the target sprung speed.

In this form, the damping force is corrected with consideration given also to the actual sprung speed. According to this form, the basic damping force can be corrected more properly, making it possible to give the driver a more appropriate operation feeling.

(9) The suspension system for the vehicle according to the form (8),
wherein the target damping-force determining portion is configured to:
(i) decrease the damping force to be generated by the shock absorber with respect to the basic damping force when the sprung speed deviation is positive and the sprung portion and the unsprung portion are relatively moved in a direction away from each other or when the sprung speed deviation is negative and the sprung portion and the unsprung portion are relatively moved in a direction toward each other, and (ii) increase the damping force to be generated by the shock absorber with respect to the basic damping force when the sprung speed deviation is negative and the sprung portion and the unsprung portion are relatively moved in the direction away from each other or when the sprung speed deviation is positive and the sprung portion and the unsprung portion are relatively moved in the direction toward each other.

In this form, the method of determining whether the damping force is to be increased or decreased with respect to the basic damping force is specified. The damping force generated by the shock absorber acts on the relative movement of the sprung portion and the unsprung portion. Even though the sprung portion should be moved upward, it is desirable to determine whether the damping force is increased or decreased depending upon the direction of the relative movement of the sprung portion and the unsprung portion. This form determines whether the damping force is to be increased or decreased with respect to the basic damping force based on whether the sprung speed deviation is positive or negative and the direction of the relative movement of the sprung portion and the unsprung portion.

(10) The suspension system for the vehicle according to the form (8) or (9), wherein the target damping-force determining portion is configured to increase an amount of correction of the damping force to be generated by the shock absorber with respect to the basic damping force with an increase in the sprung speed deviation.

In this form, the degree of the change amount with respect to the basic damping force is specified. This form ensures an appropriate magnitude of the damping force for achieving the behavior of the vehicle body in accordance with the operation input by the driver.

(11) The suspension system for the vehicle according to any one of the forms (7)-(9), wherein the target damping-force determining portion is configured to cut a component of the sprung speed deviation having a frequency lower than a set frequency.

When the sprung speed is detected by a sensor or the like, the detected sprung speed contains a speed in the up-down direction of the vehicle that arises from up and down of the road on which the vehicle runs, for instance. According to this form, it is possible to cut or remove such a comparatively constant component, so that the target sprung speed can be more proper one.

DESCRIPTION OF EMBODIMENT

Figure 1:
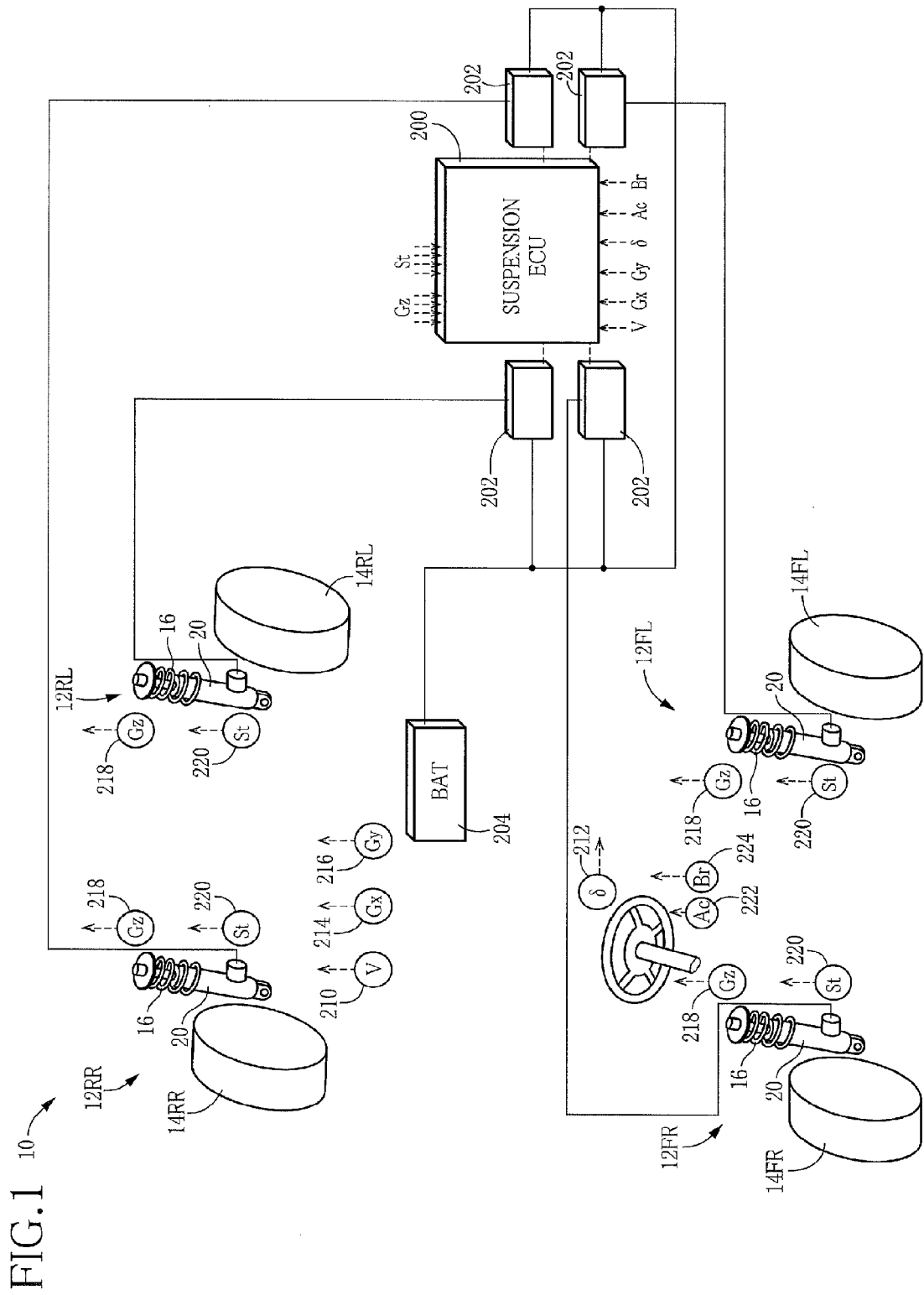
FIG. 1 is a view schematically showing a suspension system for a vehicle according to one embodiment of the claimable invention.

Referring to the drawings, there will be explained below in detail one embodiment of the claimable invention. It is to be understood that the claimable invention is not limited to the following embodiment and the forms described in FORMS OF INVENTION, but may be embodied with various changes and modifications based on the knowledge of those skilled in the art. It is to be further understood that modified examples of the following embodiment can be provided through the use of technical matters described in the forms described in FORMS OF INVENTION.

EMBODIMENT

A. Configuration of Suspension System for Vehicle

FIG. 1 schematically shows a suspension system 10 for a vehicle according to one embodiment of the claimable invention. The suspension system 10 includes four suspension apparatuses 12 of an independent suspension type corresponding to respective four wheels 14 of the vehicle. Each suspension apparatus 12 is disposed between: a suspension lower arm holding a wheel 14 and constituting a part of an unsprung portion; and a mount portion provided in a body of the vehicle and constituting a part of a sprung portion, so as to connect the suspension lower arm and the mount portion to each other. Each suspension apparatus 12 includes a coil spring 16 as a suspension spring and a hydraulic shock absorber 20. The coil spring 16 and the shock absorber 20 are disposed between the lower arm and the mount portion so as to be parallel to each other. Each of the four wheels 14 and each of the four suspension apparatuses 12 are collectively referred to as "wheel 14" and "suspension apparatus 12", respectively. Where it is necessary to distinguish the four wheels 14 from each other and to distinguish the four suspension apparatuses 12 from each other, there are attached, to each reference numeral, a suitable one of "FL", "FR", "RL", and "RR" respectively indicating a front left wheel, a front right wheel, a rear left wheel, and a rear right wheel, as a suffix to indicate a wheel position.

Figure 2:
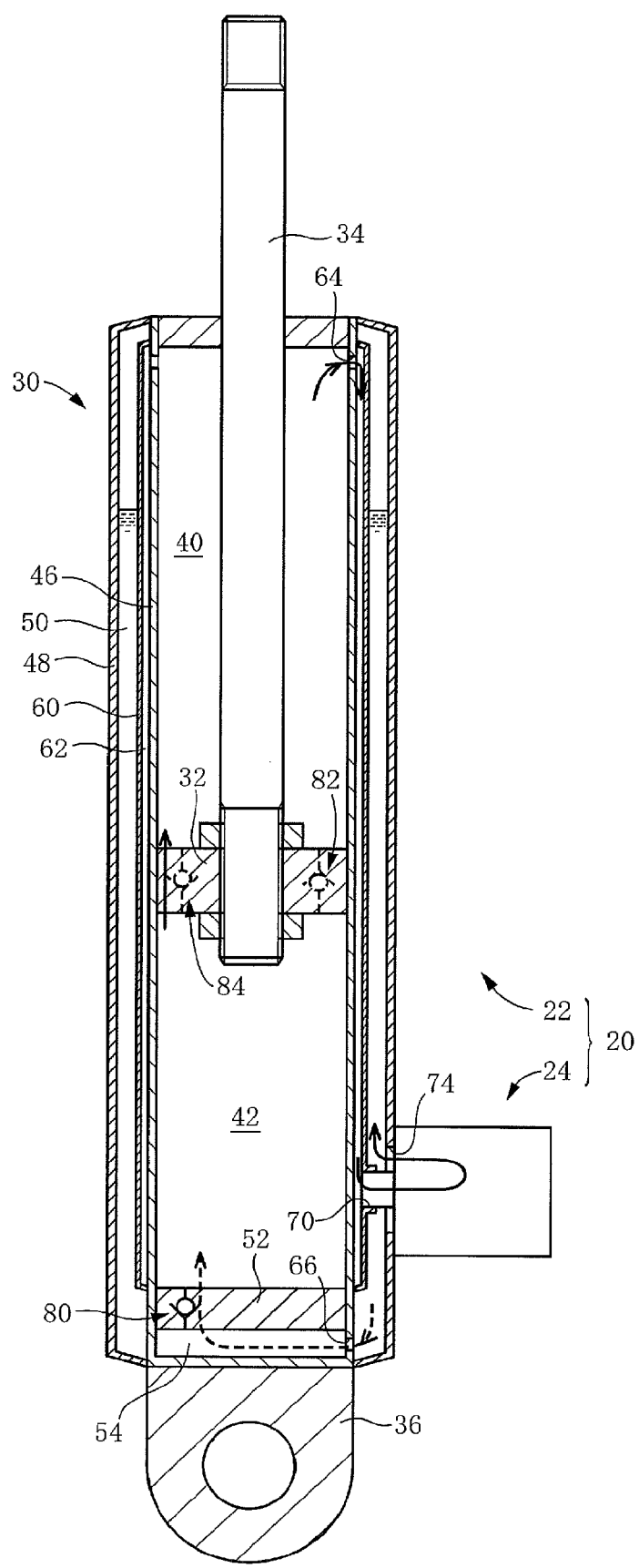
FIG. 2 is a cross-sectional view of a hydraulic shock absorber shown in FIG. 1.

As shown in FIG. 2, each hydraulic shock absorber 20 includes, as main constituent elements thereof, a cylinder 22 and a damping-force generator 24. The cylinder 22 includes a housing 30, a piston 32 disposed in the housing 30 so as to be movable in an up-down direction, and a rod 34 having one end portion (lower end portion) connected to the piston 32 and another end portion (upper end portion) protruding upward from the housing 30. A connecting member 36 is attached to a lower end of the housing 30. The housing 30 is connected, via the connecting member 36, to the unsprung portion of the vehicle (e.g., the suspension lower arm or a steering knuckle), and the upper end portion of the rod 34 on which an external thread is formed is connected to the sprung portion (e.g., the mount portion provided in the body of the vehicle) utilizing the external thread. That is, the cylinder 22 is disposed so as to connect the sprung portion and the unsprung portion of the vehicle. The cylinder 22 extends and contracts when the sprung portion and the unsprung portion move relative to each other in the up-down direction, namely, when the sprung portion and the unsprung portion move away from and toward each other. Specifically, the cylinder 22 extends when the sprung portion and the unsprung portion move relative to each other in a direction away from each other (hereinafter referred to as "in a rebound movement" or "when the sprung portion and the unsprung portion rebound" where appropriate). On the other hand, the cylinder 22 contracts when the sprung portion and the unsprung portion move relative to each other in a direction toward each other (hereinafter referred to as "in a bound movement" or "when the sprung portion and the unsprung portion bound" where appropriate).

The piston 32 is slidably movable in the housing 30. The piston 32 partitions an interior of the housing 30 into two fluid chambers 40, 42 filled with a working fluid, i.e., a rod-side chamber 40 which is located above the piston 32 and through which the rod 34 extends and an opposite chamber 42 which is located below the piston 32 and through which the rod 34 does not extend. The volumes of the two fluid chambers 40, 42 change in accordance with extension and contraction of the cylinder 22, namely, in accordance with a relative movement of the sprung portion and the unsprung portion. Specifically, when the sprung portion and the unsprung portion rebound, the volume of the rod-side chamber 40 decreases while the volume of the opposite chamber 42 increases. When the sprung portion and the unsprung portion bound, the volume of the rod-side chamber 40 increases while the volume of the opposite chamber 42 decreases.

The housing 30 has a generally twin-tube structure and includes a main tube 46 having a closed bottom end and an outer tube 48 disposed radially outwardly of the main tube 46. The periphery of each of the rod-side chamber 40 and the opposite chamber 42 is defined by an inner circumferential surface of the main tube 46. There is defined, between an outer circumferential surface of the main tube 46 and an inner circumferential surface of the outer tube 48, a buffer chamber (which may be referred to as "reservoir" or "reservoir chamber") 50 for storing the working fluid. Owing to the existence of the rod 34, the total volume of the rod-side chamber 40 and the opposite chamber 42 increases in the rebound movement and decreases in the bound movement. The buffer chamber 50 is provided for allowing a change in the total volume in a state in which the rod-side chamber 40 and the opposite chamber 42 are filled with the working fluid. There is disposed, at an inner bottom portion of the main tube 46, a partition member 52 that defines the bottom of the opposite chamber 42. A bottom fluid passage 54 is formed between the partition member 52 and the bottom wall of the main tube 46.

An intermediate tube 60 is disposed between the main tube 46 and the outer tube 48 so as to surround the main tube 46. It is noted that an inner circumference of the buffer chamber 50 is partially defined by an outer circumferential surface of the intermediate tube 60. Further, an annular fluid passage 62 having a relatively large axial dimension is formed between an inner circumferential surface of the intermediate tube 60 and the outer circumferential surface of the main tube 46.

A communication hole 64 is formed at an upper portion of the main tube 46 for fluid communication between the fluid passage 62 and the rod-side chamber 40. A bottom communication hole 66 is formed at a portion of the main tube 46 near its lower end for fluid communication between the buffer chamber 50 and the bottom fluid passage 54. An outlet 70 is formed at a lower portion of the intermediate tube 60 for permitting an outflow of the working fluid from the fluid passage 62 to the damping-force generator 24. Further, an inlet 74 is formed in the outer tube 48 so as to be coaxial with the outlet 70. The inlet 74 permits an inflow of the working fluid to the buffer chamber 50 from the damping-force generator 24 which will be later explained in detail.

The partition member 52 includes: a fluid passage for connecting the bottom fluid passage 54 and the opposite chamber 42; and a check valve 80 for the opposite chamber 42 provided in the fluid passage. The check valve 80 for the opposite chamber 42 permits, with substantial no resistance, an inflow of the working fluid from the buffer chamber 50 to the opposite chamber 42 via the bottom fluid passage 54 while prohibits an outflow of the working fluid from the opposite chamber 42 to the buffer chamber 50 via the bottom fluid passage 54.

The piston 32 includes: two fluid passages that connect the rod-side chamber 40 and the opposite chamber 42; and two check valves 82, 84 that are respectively provided in the two fluid passages. The check valve 82 has a function of allowing the working fluid to pass through the fluid passage from the rod-side chamber 40 to the opposite chamber 42 while prohibiting the working fluid from passing through the fluid passage from the opposite chamber 42 to the rod-side chamber 40. The check valve 84 has a function of allowing the working fluid to pass through the fluid passage from the opposite chamber 42 to the rod-side chamber 40 while prohibiting the working fluid from passing through the fluid passage from the rod-side chamber 40 to the opposite chamber 42. However, the check valve 82 is configured to allow the working fluid to pass through the fluid passage only when the pressure of the working fluid in the rod-side chamber 40 is considerably higher than the pressure of the working fluid in the opposite chamber 42. Consequently, the working fluid does not substantially pass through the fluid passage from the rod-side chamber 40 to the opposite chamber 42 in a normal state.

As will be later explained in detail, the damping-force generator 24 is disposed so as to cover the outlet 70 and the inlet 74. The damping-force generator 24 has a function of allowing passage, therethrough, of the working fluid which flows out of the rod-side chamber 40 and subsequently flows into the buffer chamber 50 via the fluid passage 62 and a function of giving resistance to the flow of the working fluid.

The thus constructed absorber according to the present embodiment operates as follows. In the bound movement, the working fluid flows into the rod-side chamber 40 from the opposite chamber 42 via the fluid passage of the piston 32 in which the check valve 84 is provided, as indicated by the solid-line arrow in FIG. 2. Since the amount of the working fluid that flows into the rod-side chamber 40 is larger than the volume of the rod-side chamber 40 that is increased as a result of the movement of the piston 32, the working fluid initially flows out of the rod-side chamber 40 via the communication hole 64 and the fluid passage 62, then passes through the damping-force generator 24, and finally flows into the buffer chamber 50. In this instance, there is generated a damping force with respect to contraction of the cylinder 22, namely, a damping force with respect to the bound movement, by resistance given to the flow of the working fluid that passes through the damping-force generator 24.

On the other hand, in the rebound movement, the working fluid initially flows out of the rod-side chamber 40 of the cylinder 22 via the communication hole 64 and the fluid passage 62, then passes through the damping-force generator 24, and finally flows into the buffer chamber 50, as in the bound movement. In this instance, there is generated a damping force with respect to extension of the cylinder 22, namely, a damping force with respect to the rebound movement, by resistance given to the flow of the working fluid that passes through the damping-force generator 24. It is noted that the working fluid flows into the opposite chamber 42 of the cylinder 22 from the buffer chamber 50 via the bottom communication hole 66, the bottom fluid passage 54, and the check valve 80 for the opposite chamber 42, as indicated by the dashed-line arrow in FIG. 2. In this respect, the damping force with respect to the bound movement and the rebound movement has a magnitude in accordance with the resistance given to the flow of the working fluid by the damping-force generator 24, and the damping force becomes larger with an increase in the resistance.

The damping-force generator 24 is an electromagnetic valve as described below, and the magnitude of the resistance given by the damping-force generator 24 depends on an amount of an electric current to be supplied thereto. That is, the magnitude of the damping force with respect to the rebound movement and the bound movement depends on the amount of the electric current to be supplied to the damping-force generator 24.

Figure 3:
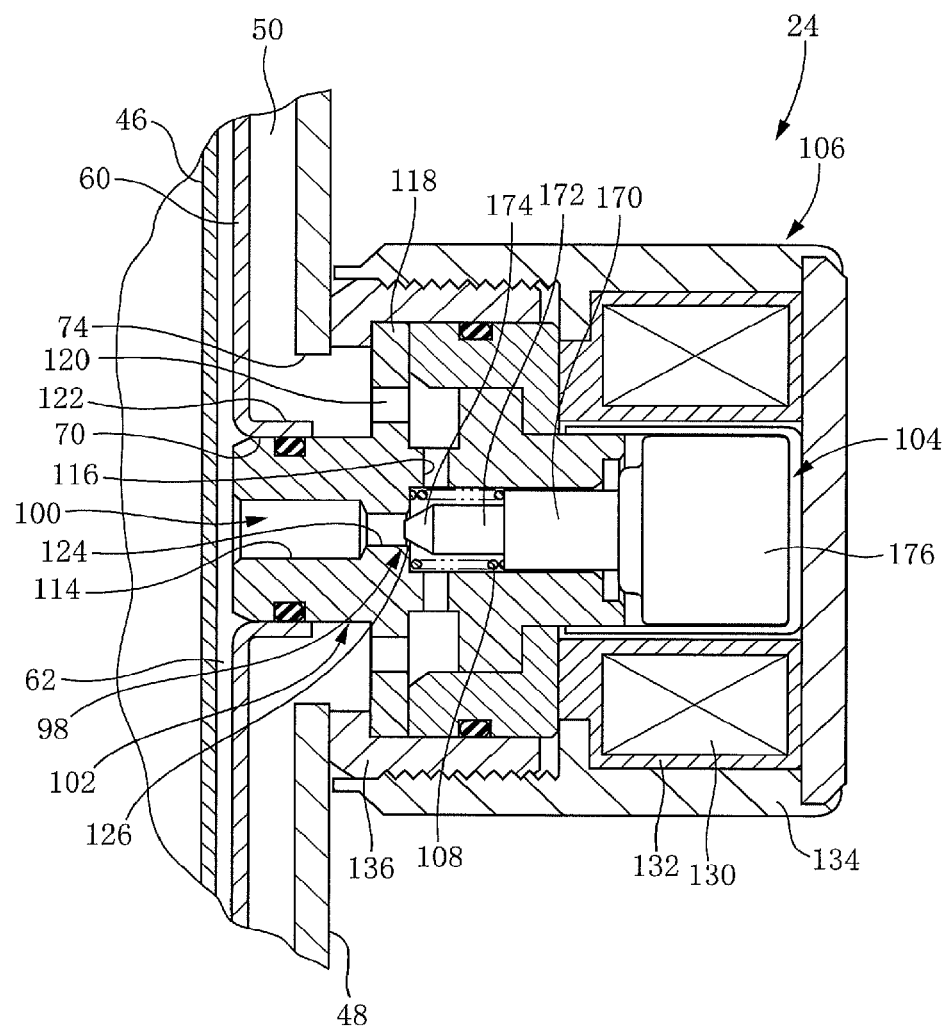
FIG. 3 is a cross-sectional view of a damping-force generator of the hydraulic shock absorber shown in FIG. 2.

Referring next to FIG. 3, the configuration and the action of the damping-force generator 24 will be explained. The damping-force generator 24 includes, as a main constituent element thereof, a valve mechanism 98 for giving the resistance to the working fluid passing through the damping-force generator 24. Specifically, the damping-force generator 24 includes a hollow valve housing 102 in which is formed a fluid passage 100 for the working fluid, a valve member 104 housed in the valve housing 102, a solenoid 106, and a spring 108 as a compression coil spring. (The valve member 104 may be referred to as a movable valve member.) The solenoid 106 has a function of giving, to the valve member 104 of the valve mechanism 98, a biasing force in a direction to limit a cross-sectional area for fluid flow of the fluid passage while the spring 108 has a function of giving, to the valve member 104, a biasing force in a direction to maximize the cross-sectional area for fluid flow of the fluid passage.

The valve housing 102 has a lateral hole 114 extending along the axis of the damping-force generator 24, a vertical hole 116 communicating with the lateral hole 114, and a through-hole 120 formed in a flange 118 that is provided on one of opposite sides of an opening of the vertical hole 116 nearer to the fluid passage 62, namely, provided on the left side of the opening of the vertical hole 116 in FIG. 3. An outer circumferential portion of a distal end (left-side end in FIG. 3) of the valve housing 102 is fitted in a sleeve 122 provided in the outlet 70 of the intermediate tube 60. In this structure, a left-side open end portion of the lateral hole 114 faces the fluid passage 62 formed between the main tube 46 and the intermediate tube 60, and the through-hole 120 faces the buffer chamber 50. Thus, the lateral hole 114, the vertical hole 116, and the through-hole 120 define the fluid passage 100 described above.

A small inner diameter portion 124 is formed in the valve housing 102 at a position of the lateral hole 114 that is located on the one of opposite sides of the vertical hole 116 nearer to the fluid passage 62 (namely, on the left side of the vertical hole 116 in FIG. 3). An annular valve seat 126 is defined by an inner periphery of the small inner diameter portion 124.

The solenoid 106 includes a coil 130, a solenoid bobbin 132 that holds the coil 130, and a cylindrical casing 134 which has a closed end and which incorporates the coil 130 and the solenoid bobbin 132. The casing 134 is threadedly engaged with a tube 136 attached to the inlet 74 of the outer tube 48.

The valve member 104 includes a large diameter portion 170 that is held in sliding contact with an inner circumference of a right-side end portion (FIG. 3) of the valve housing 102, a small diameter portion 172 extending from a left end of the large diameter portion 170 so as to be opposed to the vertical hole 116 of the valve housing 102, and a valve head 174 of a poppet type formed at a left end of the small diameter portion 172. The valve head 174 is configured to be seated on and separated away from the valve seat 126, whereby the valve member 104 opens and closes the fluid passage 100.

The valve member 104 further includes a core 176 which extends form a right end of the large diameter portion 170 and which is a main element for generating a force to suck the valve member 104 when energized. A connecting portion between the core 176 and the large diameter portion 170 has a stepped shape, and the stepped connecting portion faces a stepped end (right-side end in FIG. 3) of the valve housing 102.

The spring 108 is interposed between the left end of the large diameter portion 170 of the valve member 104 and the right end of the small inner diameter portion 124 of the valve housing 102. The spring 108 gives the valve member 104 a biasing force in a direction in which the valve member 104 is moved away from the valve seat 126, namely, a biasing force in a direction to increase the cross-sectional area for fluid flow of the fluid passage 100.

In the structure described above, a magnetic path is formed so as to pass through the casing 134, the tube 136, the valve housing 102, and the core 176 of the valve member 104. In the thus constructed solenoid 106, when the coil 130 is energized, there is generated a biasing force to move the valve member 104 in a direction in which the core 176 is moved toward the valve housing 102, in other words, in a direction in which the valve head 174 is moved toward the valve seat 126.

In the damping-force generator 24, when the electric current is supplied to the solenoid 106, namely, when the electric current is supplied to the damping-force generator 24, there is formed, in the damping-force generator 24, a fluid passage that enables a flow of the working fluid through the fluid passage 100. The damping-force generator 24 is configured to give resistance to a flow of the working fluid through the fluid passage, thereby giving resistance to a flow of the working fluid through the damping-force generator 24. Specifically, the valve mechanism 98 is provided in the fluid passage 100, and resistance is given to a flow of the working fluid that passes between the valve seat 126 and the valve member 104 of the valve mechanism 98. The magnitude of the resistance depends on the size of a clearance between the valve seat 126 and the valve member 104, namely, the valve opening degree of the valve mechanism 98. The biasing force given to the valve member 104 by the solenoid 106 depends on an amount of the electric current supplied to the solenoid 106. Thus, in view of the structure of the valve mechanism 98 described above, the valve opening degree of the valve mechanism 98 decreases with an increase in the electric current supplied to the solenoid 106. That is, the valve mechanism 98 is less likely to open. Consequently, the resistance given to the flow of the working fluid passing through the fluid passage becomes larger with an increase in the electric current supplied to the solenoid 106.

Thus, the damping-force generator 24 is configured to generate the damping force with respect to extension and contraction of the cylinder 22. The damping force increases with an increase in the supply current, and the damping coefficient on which the damping force is based increases with an increase in the supply current. In other words, the damping-force generator 24 is configured to change the resistance to the flow of the working fluid that passes through the fluid passage in accordance with the amount of the electric current supplied thereto and to generate the damping force whose magnitude depends on the amount of the supply current. That is, each of the shock absorbers 20 includes the damping-force changing mechanism configured to change the magnitude of the damping force and to generate the damping force with respect to the relative movement of the sprung portion and the unsprung portion such that the damping force is changeable.

In the suspension system 10, the shock absorbers 20 are controlled by a suspension electronic control unit 200 (hereinafter referred to as "ECU 200" where appropriate) as a controller. The ECU 200 is constituted mainly by a computer having a CPU, a ROM, a RAM, and so on. There are connected, to the ECU 200, drive circuits 202 provided so as to respectively correspond to the damping-force generators 24 of the shock absorbers 20. Each drive circuit 202 can adjust the electric current to be supplied to the corresponding damping-force generator 24. The drive circuits 202 are connected to a battery [BAT] 204 from which the electric current is supplied to the damping-force generators 24 of the respective shock absorbers 20.

The vehicle has: a vehicle speed sensor [V] 210 for detecting a running speed of the vehicle (hereinafter referred to as "vehicle speed" where appropriate); an operation angle sensor [δ] 212 for detecting an operation angle of a steering wheel; a longitudinal acceleration sensor [Gx] 214 for detecting actual longitudinal acceleration which is longitudinal acceleration actually generated in the vehicle body; a lateral acceleration sensor [Gy] 216 for detecting actual lateral acceleration which is lateral acceleration actually generated in the vehicle body; four sprung vertical acceleration sensors [Gz] 218 for detecting vertical acceleration of the respective sprung portions of the vehicle corresponding to the respective wheels 14; four stroke sensors [St] 220 for detecting strokes of the cylinders 22 of the respective shock absorbers 20 corresponding to the respective four wheels 14; an accelerator-pedal stepping force sensor [Ac] 222 for detecting an accelerator-pedal stepping force; and a brake-pedal stepping force sensor [Br] 224 for detecting a brake-pedal stepping force. These sensors are connected to the computer of the ECU 200. The ECU 200 controls the shock absorbers based on signals sent from these sensors. Characters enclosed with square brackets [ ] are signs used in the drawings to represent the sensors, etc. The ROM of the computer of the ECU 200 stores programs, various sorts of data, etc., relating to the control of the shock absorbers 20.

[B] Control of Shock Absorbers i) Control in Normal State (Control In Situation in which Driver Inputs No Operation)

Figure 4:
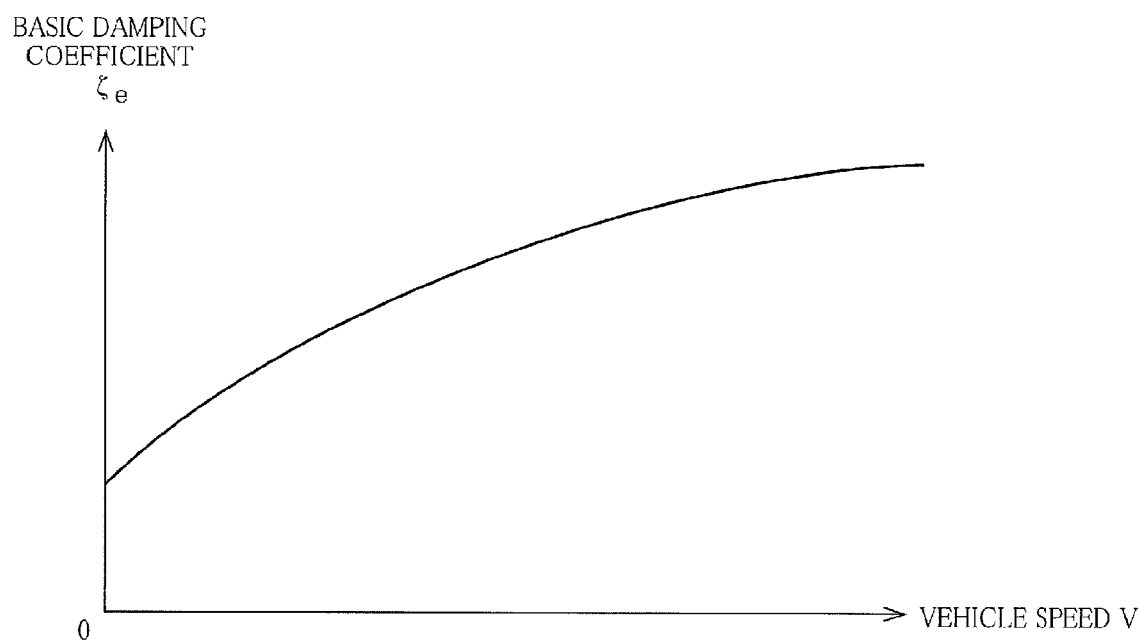
FIG. 4 is a graph schematically showing a relationship between basic damping coefficient and vehicle speed.
Figure 5:
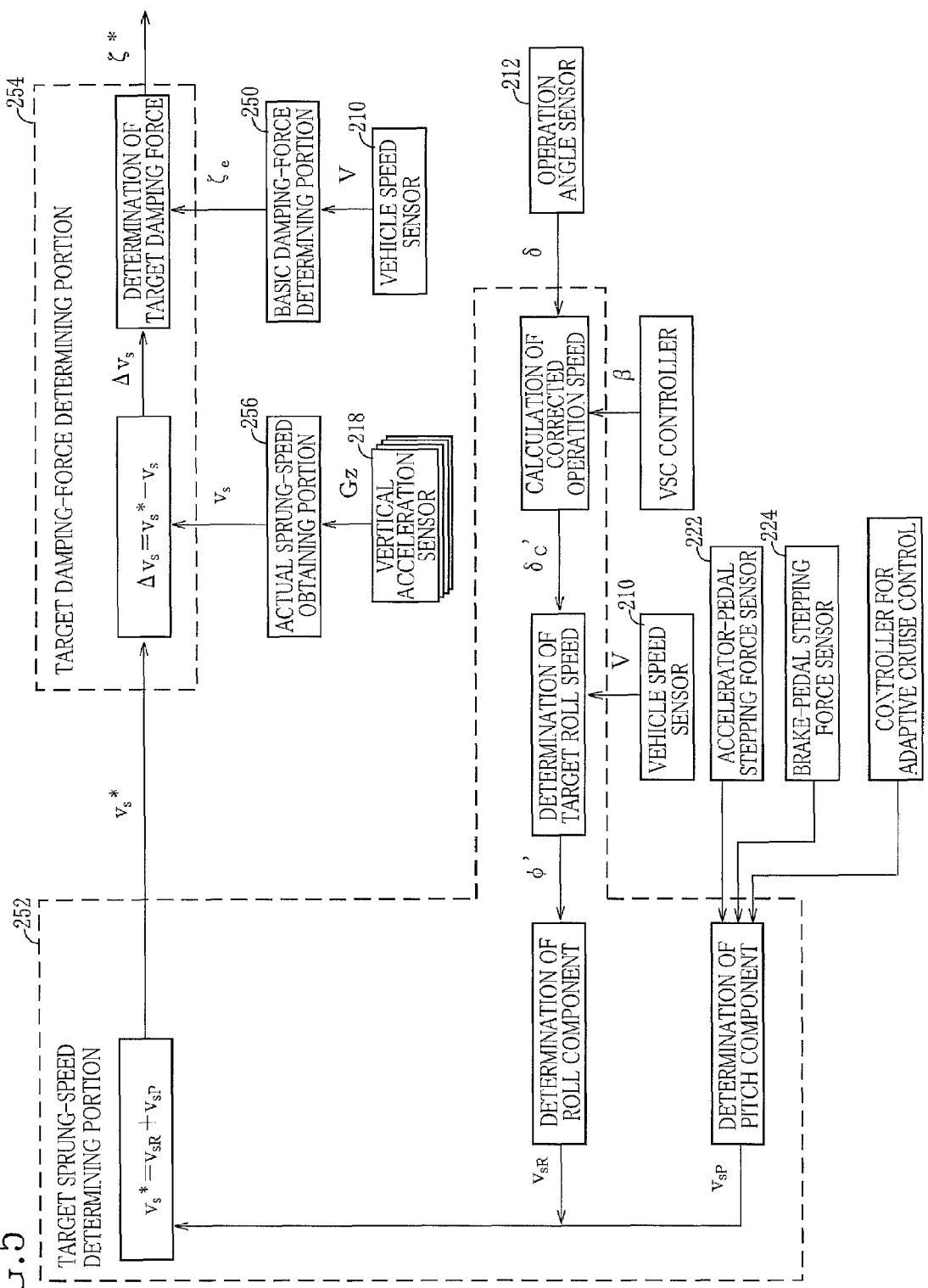
FIG. 5 is a control block diagram showing control executed in the suspension system for the vehicle according to the embodiment of the claimable invention.

FIG. 5 is a block diagram showing control in the suspension system 10. The control of each shock absorber in a normal state is executed for reducing vibration generated in the vehicle, by generating a damping force based on a damping coefficient in accordance with a vehicle speed. That is, the supply current is controlled such that the damping force (the damping coefficient) increases with an increase in the vehicle speed. Specifically, the RANI of the ECU 200 stores map data shown in FIG. 4. Referring to the map data, a damping coefficient $\zeta_e$ is determined for a vehicle speed V detected by the vehicle speed sensor 210. A supply current I to the damping-force generator 24 is controlled such that the determined damping coefficient $\zeta_e$ is attained.

ii) Control in Situation in which Driver Inputs Operation

In the suspension system 10, when the driver inputs an operation to the vehicle, there is executed control for adjusting the damping force such that the vehicle body behaves according to the operation input by the driver. Specifically, in an instance where a steering operation is input by the driver, the control for adjusting the damping force is executed such that rolling of the vehicle body matches or is consonant with the steering operation. In an instance where there is generated acceleration or deceleration of the vehicle by an accelerating operation or a braking operation, the control for adjusting the damping force is executed such that pitching of the vehicle body matches or is consonant with the corresponding accelerating or braking operation. To be more specific, in the control, a target sprung speed $v_s^*$ as a target of the speed of each of the sprung portions corresponding to the respective wheels 14 is determined based on the operation input by the driver, and the damping force to be generated in the normal state, namely, the damping coefficient $\zeta_e$, is corrected such that the actual sprung speed becomes close to the determined target sprung speed $v_s^*$. The damping coefficient $\zeta_e$ determined based on the vehicle speed V is a basic damping coefficient which is a basis for determining a target damping coefficient in the situation in which the driver inputs an operation.

(a) Correction Based on Steering Operation

In the suspension system 10, in an instance where a steering operation is input, specifically, in an instance where a steering operation exceeding a set operation angle $\delta_0$ is input, there is executed control for correcting the basic damping coefficient. As explained above, when such a steering operation is input, a target roll speed $\phi'$ (roll angle: $\phi$) is initially determined such that rolling of the vehicle body matches or is consonant with the input steering operation.

There is first explained a process to derive an expression to calculate the target roll speed $\phi'$. Steady-state lateral acceleration $a_y$ with respect to the operation angle $\delta$ is represented by the following expressions:

$$a_y = K_{Gy}\delta$$

$$K_{Gy} = 2K_f K_r lV^2 / \{2K_f K_r l^2 - m(K_f l_f - K_r l_r)V^2\}$$

wherein $K_{Gy}$: steady-state lateral acceleration gain, $K_f$: front equivalent cornering power, $K_r$: rear equivalent cornering power, l: wheel base, $l_f$: distance between vehicle's center of gravity and front wheel axis, $l_r$: distance between vehicle's center of gravity and rear wheel axis, and m: vehicle mass.

Further, equation of motion about the roll axis is represented by the following expression:

$$G_s\phi = h_s m_s a_y + h_s \phi m_s g$$

wherein $G_s$: roll stiffness, $h_s$: roll arm length, and $m_s$: sprung mass. By substituting the above-indicated steady-state lateral acceleration in this expression and organizing the expression in terms of the roll angle $\phi$, the following expression is obtained:

$$\phi = \{h_s m_s K_{Gy}/(G_s - h_s m_s g)\}\delta$$

By differentiating both sides of the expression, the following expression is obtained:

$$\phi' = \{h_s m_s K_{Gy}/(G_s - h_s m_s g)\}\delta'$$

wherein $\delta'$: operation speed.

That is, the target roll speed $\phi'$ is determined on the basis of: the steady-state lateral acceleration gain $K_{Gy}$ calculated based on the vehicle speed V; and the operation speed $\delta'$ of the steering operation. On the basis of the determined target roll speed φ', there is determined a roll component $v_{sR}$ of the target sprung speed $v_s^*$ of each of the sprung portions corresponding to the respective wheels 14.

It is noted, however, that the vehicle on which the suspension system 10 is installed is configured to execute the so-called VSC control as control for changing an orientation of the vehicle body, i.e., for changing a travelling direction of the vehicle, by controlling driving and braking of each wheel, in order to prevent or reduce sideslip of the vehicle, namely, as vehicle-body turning control. Thus, the orientation of the vehicle body is changed also by the VSC control, independently of changing of the orientation of the vehicle body by the steering operation input by the driver. In the suspension system 10, therefore, the roll component $v_{sR}$ of the target sprung speed is determined with consideration given also to the changing of the orientation of the vehicle body by the VSC control.

Initially, a vehicle-body sideslip angle β is obtained from a controller that is responsible for the VSC control. On the basis of the vehicle-body sideslip angle β, there is calculated a converted operation angle $\delta_B$ that is obtained by converting the vehicle-body sideslip angle β into the operation angle. The detected operation angle δ of the steering operation is corrected utilizing the converted operation angle $\delta_B$ according to the following expression:

$$\delta_C = \delta - \delta_B$$

By utilizing the thus obtained corrected operation angle $\delta_C$, a corrected operation speed $\delta_C'$ is calculated, and the roll component $v_{sR}$ of the target sprung speed is determined based on the corrected operation speed $\delta_C'$.

(b) Correction Based on Accelerating Operation or Braking Operation

In the suspension system 10, in an instance where an accelerating operation or a braking operation is input, specifically, in an instance where an operation exceeding a set stepping force is input, there is executed control for correcting the basic damping coefficient. As explained above, when the accelerating operation or the braking operation is input, a target pitch speed θ' (pitch angle: θ) is initially determined such that pitching of the vehicle body matches or is consonant with the accelerating operation or the braking operation. While not explained in detail, the target pitch speed θ' is determined based on: a value detected by the accelerator-pedal stepping force sensor 222 or the brake-pedal stepping force sensor 224; and the vehicle speed V. On the basis of the determined target pitch speed θ', there is determined a pitch component $V_{sP}$ p of the target sprung speed of each of the sprung portions corresponding to the respective wheels 14.

It is noted that the vehicle on which the suspension system 10 is installed is configured to execute adaptive cruise control in which acceleration or deceleration of the present vehicle is adjusted while following a preceding vehicle that travels ahead of the present vehicle. In this case, the vehicle is accelerated or decelerated by the adaptive cruise control without the accelerating or braking operation by the driver. In the suspension system 10, therefore, when the adaptive cruise control is being executed, the pitch component $v_{sP}$ of the target sprung speed is determined based on acceleration or deceleration by the adaptive cruise control.

(c) Correction of Damping Coefficient

The target sprung speed $v_s^*$ is determined by adding the roll component $v_{sR}$ and the pitch component $V_{sP}$ of the target sprung speed determined as described above. It is noted that the target sprung speed $v_s^*$ in the upward direction is positive while the target sprung speed $v_s^*$ in the downward direction is negative.

$$v_s^* = v_{sR} + v_{sP}$$

In the suspension system 10, an actual sprung speed $v_s$ which is an actual speed of the sprung portion is used in addition to the target sprung speed $v_s^*$ when the basic damping coefficient is corrected.

Specifically, the actual sprung speed $v_s$ is initially estimated based on a value detected by the sprung vertical acceleration sensor 218. Then there is calculated a sprung speed deviation $\Delta v_s$ which is a deviation of the actual sprung speed $v_s$ from the target sprung speed $v_s^*$. The damping force generated by the shock absorber 20 acts with respect to the relative movement of the sprung portion and the unsprung portion. It is therefore determined whether the damping force (the basic damping coefficient) is to be increased or decreased depending on whether the sprung speed deviation $\Delta v_s$ is positive or negative and in which direction the sprung portion and the unsprung portion relatively move. Specifically, when the sprung speed deviation $\Delta v_s$ is positive and the sprung portion and the unsprung portion relatively move in a direction away from each other, the damping force (the basic damping coefficient) is decreased for permitting the sprung portion to easily move upward. When the sprung speed deviation $\Delta v_s$ is positive and the sprung portion and the unsprung portion relatively move in a direction toward each other, the damping force (the basic damping coefficient) is increased for making the sprung portion hard to move downward. Further, when the sprung speed deviation $\Delta v_s$ is negative and the sprung portion and the unsprung portion relatively move in the direction toward each other, the damping force (the basic damping coefficient) is decreased for permitting the sprung portion to easily move downward. When the sprung speed deviation $\Delta v_s$ is negative and the sprung portion and the unsprung portion relatively move in the direction away from each other, the damping force (the basic damping coefficient) is increased for making the sprung portion hard to move upward.

The sprung speed deviation $\Delta v_s$ is subjected to filtering for cutting a component thereof having a frequency lower than a set frequency $v_0$ (e.g., 0.4 Hz), and the filtered value of the sprung speed deviation $\Delta v_s$ is used, thereby removing a relatively constant component generated when the vehicle runs on a hill or the like.

A change amount $\Delta\zeta$ of the basic damping coefficient is proportional to the sprung speed deviation $\Delta v_s$. That is, the change amount $\Delta\zeta$ of the basic damping coefficient is calculated according to the following expression:

$$\Delta\zeta = K_\zeta \text{sgn}(\Delta v_s^* v_{st}) \cdot |\Delta v_s|$$

wherein sgn(x) is a sign function to output the sign of x, and $v_{st}$ is a stroke speed. The stroke speed $v_{st}$ is positive in the contraction state and negative in the extension state.

Subsequently, the target damping coefficient $\zeta^*$ is determined according to the following expression:

$$\zeta^* = \zeta_e + \Delta\zeta$$

The supply current I to the damping-force generator 24 is controlled to attain the thus determined target damping coefficient $\zeta^*$.

[C] Control Programs

Figure 6:
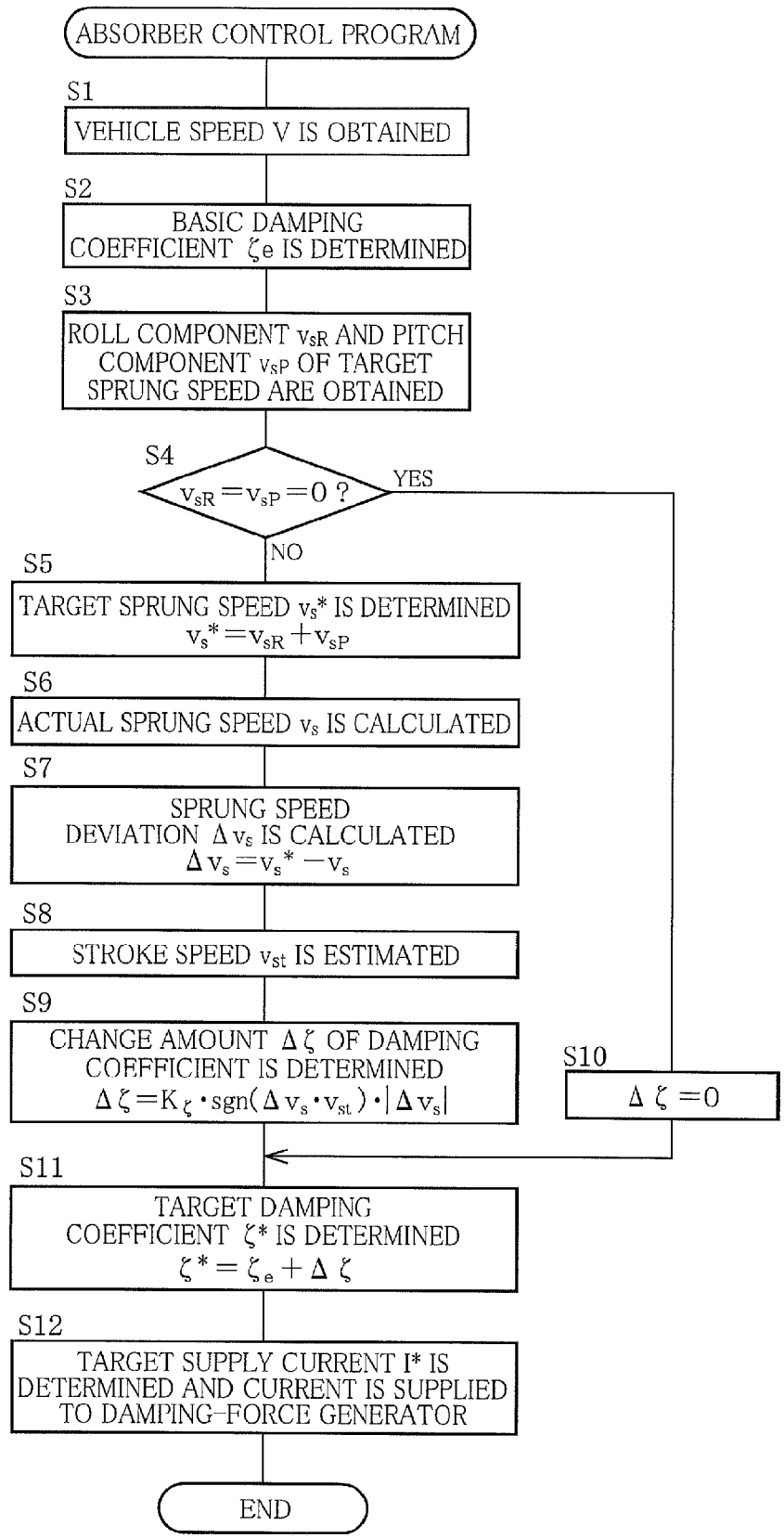
FIG. 6 is a flow chart showing an absorber control program executed by a controller shown in FIG. 1.
Figure 7:
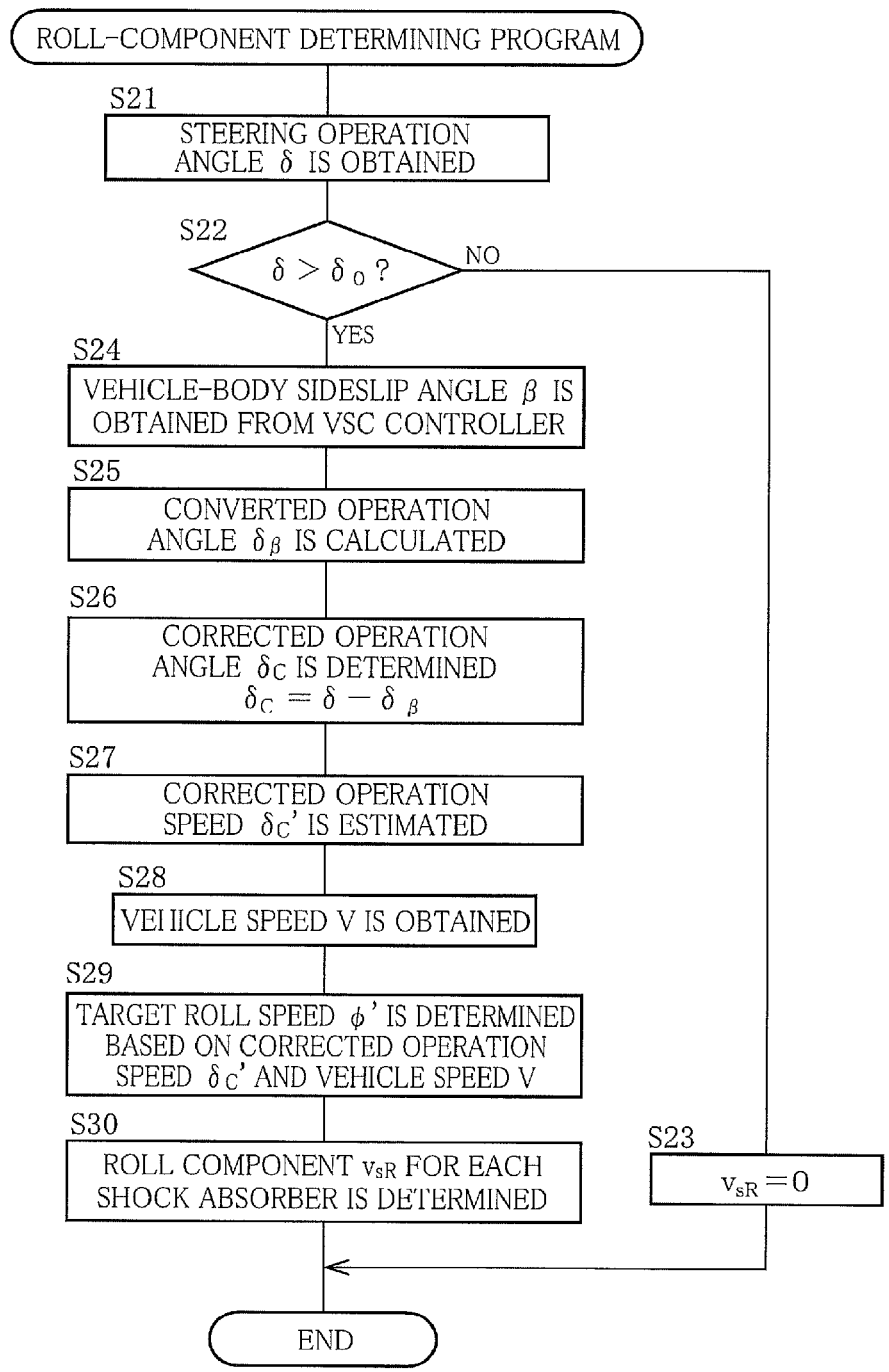
FIG. 7 is a flow chart showing a roll-component determining program executed by the controller shown in FIG. 1.
Figure 8:
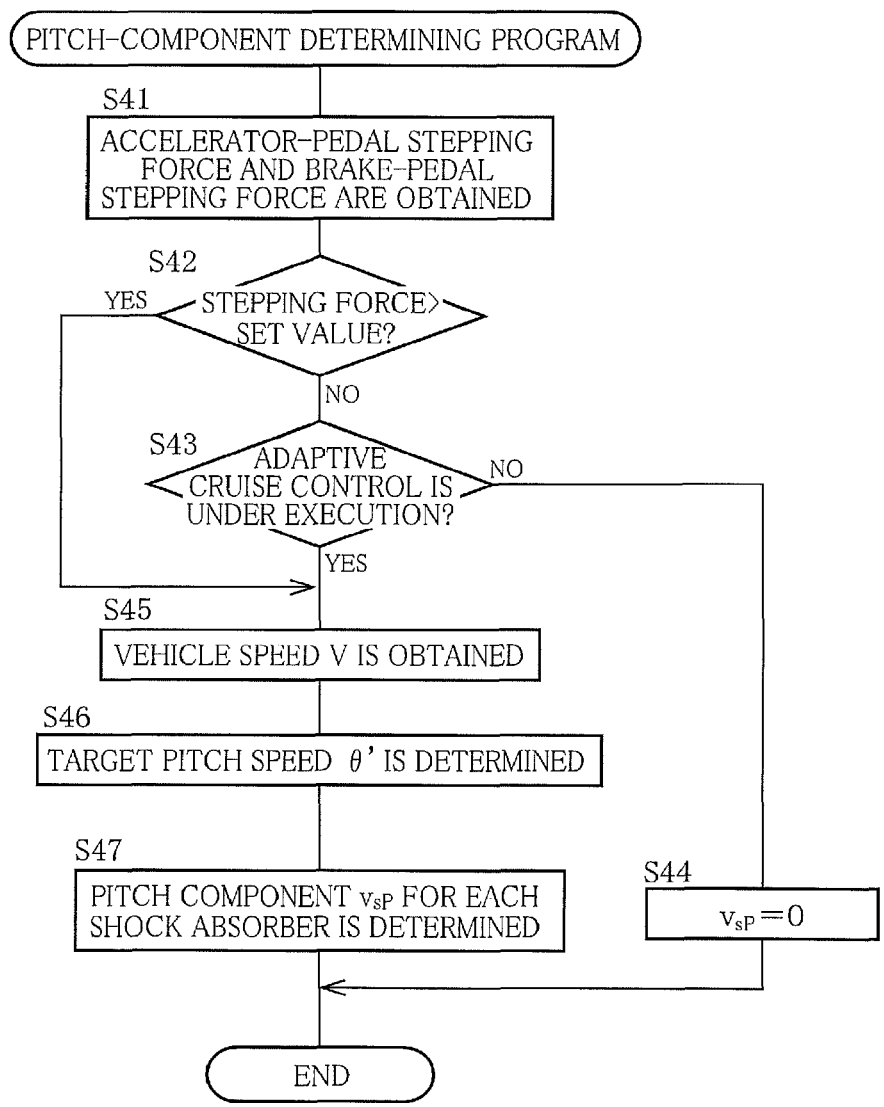
FIG. 8 is a flow chart showing a pitch-component determining program executed by the controller shown in FIG. 1.

Control of the suspension system for the vehicle according to the present embodiment is executed such that the ECU 200 executes, for each shock absorber, an absorber control program indicated by a flow chart of FIG. 6 and executes a roll-component determining program indicated by a flow chart of FIG. 7 and a pitch-component determining program indicated by a flow chart of FIG. 8. These programs are repeatedly executed at a short time pitch, e.g., from several μsec to several tens of μsec. The control will be hereinafter explained in detail referring to the flow charts.

In the absorber control program, the vehicle speed V is initially obtained at Step 1 from the vehicle speed sensor 210. (Hereinafter, "Step" is abbreviated as "S".) Subsequently, at S2, the basic damping coefficient $\zeta_e$ is determined based on the vehicle speed V referring to the map data shown in FIG. 4. Then the roll component $v_{sR}$ and the pitch component $v_{sP}$ of the target sprung speed determined in the respective two programs (that will be explained) are obtained at S3. It is determined at S4 whether both of the roll component $v_{sR}$ and the pitch component $v_{sP}$ are 0. When at least one of the roll component $v_{sR}$ and the pitch component $v_{sP}$ is not 0, correction of the basic damping coefficient is executed at S5 and its subsequent steps for permitting the behavior of the vehicle body to match or be consonant with the operation input by the driver.

At S5, the roll component $v_{sR}$ and the pitch component $v_{sP}$ are added so as to determine the target sprung speed $v_s^*$. Subsequently, the actual sprung speed $v_s$ is calculated from the detection value of the sprung vertical acceleration sensor 218 at S6, and the deviation $\Delta v_s$ ($=v_s^*-v_s$) of the actual sprung speed $v_s$ with respect to the target sprung speed $v_s^*$ is calculated at S7. Next, at S8, the stroke speed $v_{st}$ is estimated. The stroke speed $v_{st}$ is estimated based on the detection value of the stroke sensor 220 obtained in previous execution of the program and the detection value of the stroke sensor 220 obtained in current execution of the program. The change amount $\Delta \zeta$ of the damping coefficient is determined at S9 based on the sprung speed deviation $\Delta v_s$ and the stroke speed $v_{st}$, according to the expression described above. When it is determined at S4 that both of the roll component $v_{sR}$ and the pitch component $v_{sP}$ are 0, the change amount $\Delta \zeta$ is made equal to 0 at S10 so as not to correct the basic damping coefficient.

The thus determined change amount $\Delta \zeta$ is added to the basic damping coefficient $\zeta_e$ so as to determine the target damping coefficient $\zeta^*$ at S11. Subsequently, at S12, the target supply current I* to the damping-force generator 24 is determined based on the target damping coefficient $\zeta^*$, and the determined current is supplied to the damping-force generator 24. Thus, one execution of the absorber control program is ended.

There will be next explained the roll-component determining program indicated by the flow chart shown in FIG. 7. According to this program, the steering operation angle $\delta$ is initially obtained at S21 from the operation angle sensor 212. It is then determined at S22 whether the operation angle $\delta$ is larger than a set value $\delta_0$. When the operation angle $\delta$ is equal to or smaller than the set value $\delta_0$, the roll component $v_{sR}$ of the target sprung speed is made equal to 0 at S23, and correction of the damping coefficient based on the steering operation is not executed. When the operation angle $\delta$ is larger than the set value $\delta_0$, there is executed processing for determining the roll component $v_{sR}$ at S24 and its subsequent steps.

The vehicle on which the present suspension system is installed is configured to execute the VSC control. Thus, changing of the orientation of the vehicle body by the VSC control is taken into account in addition to changing of the orientation of the vehicle body by the steering operation. Specifically, the vehicle-body sideslip angle $\beta$ is initially obtained at S24 from the controller that executes the VSC control. The obtained vehicle-body sideslip angle $\beta$ is converted into the steering operation angle at S25. Subsequently, at S26, the steering operation angle $\delta$ obtained at S21 is corrected by the converted operation angle $\delta_\beta$. Then the operation speed $\delta_C'$ for the corrected operation angle is estimated at S27 based on the corrected operation angle $\delta_C$ and the corrected operation angle $\delta_C$ obtained in previous execution of the program.

Next, the vehicle speed V is obtained at S28. On the basis of the vehicle speed V and the operation speed $\delta_C'$ for the corrected operation angle, the target roll speed $\phi'$ is determined at S29 according to the expression described above. The roll component $v_{sR}$ of the target sprung speed is determined at S30 for each of the four shock absorbers 20 based on the target roll speed $\phi'$. Thus, one execution of the roll-component determining program is ended.

There will be explained the pitch-component determining program indicated by the flow chart shown in FIG. 8. According to this program, the accelerator-pedal stepping force and the brake-pedal stepping force are initially obtained at S41 respectively from the accelerator-pedal stepping force sensor 222 and the brake-pedal stepping force sensor 224. It is then determined at S42 whether the accelerator-pedal stepping force or the brake-pedal stepping force is larger than a set value. When the accelerator-pedal stepping force or the brake-pedal stepping force is larger than the set value, the vehicle speed V is obtained at S45. Subsequently, at S46, the target pitch speed $\theta'$ is determined based on the stepping force on the accelerator pedal or the brake pedal to which the operation was input and the vehicle speed V.

On the other hand, when it is determined at S42 that both of the accelerator-pedal stepping force and the brake-pedal stepping force are equal to or smaller than the set value, it is determined at S43 whether the adaptive cruise control is being executed. When the adaptive cruise control is being executed, a target throttle opening or a target brake pressure is obtained from the controller that executes the adaptive cruise control. Then the target pitch speed $\theta'$ is determined at S46 based on the obtained value and the vehicle speed V obtained at S45.

When it is determined at S43 that the adaptive cruise control is not being executed, the pitch component $v_{sP}$ of the target sprung speed is made equal to 0 at S44, and correction of the damping coefficient based on the accelerating operation or the braking operation is not carried out. Thus, one execution of the pitch-component determining program is ended.

[D] Functional Configuration of Controller

In view of the functions described above, the ECU 200 as the controller includes, as shown in FIG. 5, (i) a basic damping-force determining portion 250 configured to determine the basic damping force which has a magnitude according to a predetermined control rule and which is a basis for determining a target of the damping force to be generated by each shock absorber 20, (ii) a target sprung-speed determining portion 252 configured to determine the target sprung speed $v_s^*$ which is a target of the speed of the sprung portion, based on the operation input to the vehicle by the driver, and (iii) a target damping-force determining portion 254 configured to determine the target damping force which is a target of the damping force to be generated by each shock absorber 20, by correcting the basic damping force based on the target sprung speed. Further, the target damping-force determining portion 254 is configured to correct the basic damping force based on the sprung speed deviation $\Delta v_s$ which is a deviation of the actual sprung speed $v_s$ from the target sprung speed $v_s^*$. The ECU 200 further includes an actual sprung-speed obtaining portion 256 configured to obtain the actual sprung speed which is an actual speed of the sprung portion.

In the ECU 200 of the present suspension system for the vehicle, the basic damping-force determining portion 250 is constituted by a portion of the ECU 200 that executes the processing of S1 and S2 of the absorber control program.

The target sprung-speed determining portion 252 is constituted by a portion of the ECU 200 that executes the processing of the roll-component determining program, the pitch-component determining program, and S5 of the absorber control program. The target damping-force determining portion 254 is constituted by a portion of the ECU 200 that executes the processing of S6-S9 and S11 of the absorber control program.

[E] Characteristics of Suspension System for Vehicle

In the suspension system 10 for the vehicle constructed as described above, the behavior of the vehicle body is controlled so as to attain the target sprung speed determined based on the operation input to the vehicle by the driver. Consequently, the vehicle body behaves according to the operation input by the driver, so that it is possible to reduce an unnatural feeling which would be otherwise given to the driver due to inconsistency between the driver's operation and the behavior of the vehicle body, in other words, it is possible to give an appropriate operation feeling to the driver. Further, the suspension system 10 is configured to determine the target sprung speed based on not only the operation input by the driver, but also the information relating to the motion control of the vehicle. That is, the present suspension system enables the vehicle body to behave with consideration given to actual turning of the vehicle and the degree of acceleration or deceleration of the vehicle. It is thus possible to reduce an unnatural feeling which would be otherwise given to the driver due to inconsistency between the running state of the vehicle and the behavior of the vehicle body.

DESCRIPTION OF REFERENCE SIGNS

10: suspension system for vehicle 12: suspension apparatus 14: wheel 16: suspension spring 20: hydraulic shock absorber 22: cylinder 24: damping-force generator (damping-force changing mechanism) 30: housing 98: valve mechanism 104: valve member 106: solenoid 200: suspension electronic control unit [ECU] (controller) 204: battery [BAT] 210: vehicle speed sensor [V] 212: operation angle sensor [δ] 218: sprung vertical acceleration sensor [Gz] 220: stroke sensor [St] 222: accelerator-pedal stepping force sensor [Ac] 224: brake-pedal stepping force sensor [Br] 250: basic damping-force determining portion 252: target sprung-speed determining portion 254: target damping-force determining portion 256: actual sprung-speed obtaining portion $\zeta_e$: basic damping coefficient $\zeta^*$: target damping coefficient $\Delta\zeta$: change amount of damping coefficient $v_s$: sprung speed (actual sprung speed) $v_s^*$: target sprung speed $v_{sR}$: roll component $v_{sP}$: pitch component $\Delta v_s$: sprung speed deviation δ: steering operation angle δ': steering operation speed $\delta_\beta$: converted operation angle $\delta_C$: corrected operation angle $\delta_C'$: corrected operation speed φ': target roll speed $v_{st}$: stroke speed I*: target supply current

The invention claimed is:

1. A suspension system for a vehicle, comprising:
(a) a shock absorber disposed between a sprung portion and an unsprung portion and having a damping-force changing mechanism for changing a magnitude of a damping force, the shock absorber being configured to generate the damping force with respect to a relative movement of the sprung portion and the unsprung portion such that the magnitude of the damping force is changeable; and
(b) a controller configured to control the damping-force changing mechanism so as to control the damping force to be generated by the shock absorber,
wherein the controller includes a target sprung-speed determining portion configured to determine, as a target sprung speed which is a target of a speed of the sprung portion, a speed of the sprung portion in a behavior of a body of the vehicle that matches an operation input to the vehicle by a driver, for permitting the behavior to match the operation input, the controller being configured to control the damping force such that the speed of the sprung portion becomes equal to the target sprung speed
wherein the controller further includes:
a basic damping-force determining portion configured to determine a basic damping force which has a magnitude in accordance with a predetermined control rule and which is a basis when determining a target of the damping force to be generated by the shock absorber; and
a target damping-force determining portion configured to determine a target damping force as the target of the damping force to be generated by the shock absorber by correcting the basic damping force based on the target sprung speed,
wherein the controller further includes an actual sprung-speed obtaining portion configured to obtain an actual sprung speed that is an actual speed of the sprung portion, and
wherein the target damping-force determining portion is configured to correct the basic damping force based on a sprung speed deviation that is a deviation of the actual sprung speed from the target sprung speed.

2. The suspension system for the vehicle according to claim 1, wherein the target sprung-speed determining portion is configured to determine the target sprung speed based on a steering operation input by the driver.

3. The suspension system for the vehicle according to claim 2, wherein the target sprung-speed determining portion is configured to determine, based on an operation speed of the steering operation and a speed of the vehicle, a target roll speed as a target of a speed at which a body of the vehicle is caused to be rolled and to determine the target sprung speed based on the target roll speed.

4. The suspension system for the vehicle according to claim 3, wherein the target sprung-speed determining portion is configured to determine the target roll speed by a product of a gain determined based on the speed of the vehicle and the operation speed of the steering operation.

5. The suspension system for the vehicle according to claim 4, wherein the target sprung-speed determining portion is configured to determine the target sprung speed based on the operation input to the vehicle by the driver and information relating to motion control being executed in the vehicle.

6. The suspension system for the vehicle according to claim 5,
wherein the vehicle on which the suspension system is installed is configured to execute, as the motion control being executed in the vehicle, vehicle-body turning control in which an orientation of a body of the vehicle is changed, independently of changing of the orientation of the body of the vehicle by a steering operation input by the driver, and
wherein the target sprung-speed determining portion is configured to determine the target sprung speed based on the steering operation input by the driver and the information relating to the vehicle-body turning control.

7. The suspension system for the vehicle according to claim 1,
wherein the target damping-force determining portion is configured to:
(i) decrease the damping force to be generated by the shock absorber with respect to the basic damping force when the sprung speed deviation is positive and the sprung portion and the unsprung portion are relatively moved in a direction away from each other or when the sprung speed deviation is negative and the sprung portion and the unsprung portion are relatively moved in a direction toward each other, and (ii) increase the damping force to be generated by the shock absorber with respect to the basic damping force when the sprung speed deviation is negative and the sprung portion and the unsprung portion are relatively moved in the direction away from each other or when the sprung speed deviation is positive and the sprung portion and the unsprung portion are relatively moved in the direction toward each other.

8. The suspension system for the vehicle according to claim 1, wherein the target damping-force determining portion is configured to increase an amount of correction of the damping force to be generated by the shock absorber with respect to the basic damping force with an increase in the sprung speed deviation.

9. The suspension system for the vehicle according to claim 1, wherein the target damping-force determining portion is configured to cut a component of the sprung speed deviation having a frequency lower than a set frequency.

* * * * *